Patented Jan. 28, 1936

2,028,981

UNITED STATES PATENT OFFICE 2,028,981

PRODUCTION OF AZO DYESTUFFS

Hans Krzikalla, Ludwigshafen-on-the-Rhine, and Walther Kuehne, Mannheim, Germany, assignors to General Aniline Works, Inc., New York, N. Y., a corporation of Delaware No Drawing. Application April 2, 1935, Serial No. 14,224. In Germany April 11, 1934

4 Claims. (Cl. 260—12)

The present invention relates to a process of producing azo dyestuffs containing metals.

For the preparation of azo dyestuffs containing metals from azo dyestuffs capable of forming complex metal compounds, the chlorides, fluorides, sulphates, formates and acetates of metals capable of forming such complex compounds have usually been employed hitherto.

We have now found that azo dyestuffs containing metals are obtained in a considerably more simple manner by causing salts of halogen-substituted low molecular fatty acids with metals capable of forming complexes to act on azo dyestuffs which are capable of forming complex metal compounds. According to this invention, the preparation of the metal compounds of the azo dyestuffs proceeds in a short time and in a very smooth and advantageous manner. The metal compounds formed have an especially high levelling power and a good fastness to washing.

Suitable metal salts of the said kind are for example chromium and copper salts of monochloracetic acid, monobromacetic acid, dichloracetic acid, beta-chlorpropionic acid or of mixtures, such as monoacetic and dichloracetic acids or the acid mixture remaining in the preparation of chloracetic acid. Mixtures of salts of halogen-substituted lower fatty acids with other agents supplying metals may also be employed.

The following examples will further illustrate how the said invention may be carried out in practice, but the invention is not restricted to these examples.

Example 1

A mixture of about 0.1 molecular proportion in grams of the ortho-hydroxyazo dyestuff derived from 4-chlor-2-aminophenol and 2-hydroxynaphthalene-6-sulphonic acid, with 10 grams of chromium oxide in the form of its hydrate and 40 grams of monochloracetic acid is dissolved in about 1 liter of water and boiled under reflux. The formation of the complex metal compound is completed even after heating for about half an hour and the dyestuff is then separated in the usual manner. It dyes wool very pure violet shades.

Example 2

0.1 molecular proportion in grams of the ortho-hydroxy dyestuff derived from 1-amino-2-hydroxynaphthalene-4-sulphonic acid and 1-phenyl-3-methyl-5-pyrazolone is dissolved in about 1 liter of water and heated for three hours at 125° C. in a pressure-tight vessel with 10 grams of chromium oxide and 50 grams of the acid mixture remaining in the preparation of chloracetic acid. The resulting mixture is filtered by suction, and the resulting dyestuff converted into its sodium salt and then salted out. Pure rose shades are obtained on wool.

Example 3

0.1 molecular proportion in grams of the ortho alkoxyazo dyestuff derived from 1-methoxy-2-amino-4-chlor-5-nitrobenzene and 1-hydroxynaphthalene-4,8-disulphonic acid is dissolved in about 1 liter of water, 10 grams of chromium oxide and 20 grams of monochloracetic acid are added and the whole is heated for three hours at about 130° C. The dyestuff is salted out and dried. Navy-blue shades which are very fast to light are obtained on wool.

Example 4

0.1 molecular proportion in grams of the azo dyestuff derived from 2-aminobenzoic acid and 1-phenyl-3-methyl-5-pyrazolone is suspended in 1.5 liters of water, 8 grams of chromium oxide and 30 grams of monochloracetic acid are added and the whole heated for seven hours at 135° C. The dyestuff is then filtered off by suction and dried. It dyes cellulose ester or ether lacquers golden yellow shades which are very fast to light.

Example 5

About 0.1 molecular proportion in grams of the ortho-alkoxyazo dyestuff derived from diazotized 1-methoxy-4-chlor-2-aminobenzene and 2-hydroxynaphthalene-6,8-disulphonic acid is dissolved in about 1 liter of water, 10 grams of chromium oxide and 40 grams of monochloracetic acid are added and the whole is boiled for 24 hours under reflux. The dyestuff is then separated in the usual manner. It dyes wool pure violet shades. Instead of monochloracetic acid monobromacetic acid or beta-chlorpropionic acid may be employed.

Example 6

0.1 molecular proportion in grams of the ortho-alkoxyazo dyestuff derived from diazotized 1-methoxy-2-aminobenzene-4-sulphonic acid benzyl ester and 2-hydroxynaphthalene-6,8-disulphonic acid is dissolved in about 800 cubic centimeters of water, 10 grams of chromium oxide and 40 grams of monochloracetic acid are added and the whole is boiled for 18 hours under reflux. The solution is then worked up in the usual manner. The dyestuff thus obtained dyes wool clear Bordeaux-red shades.

What we claim is:—

1. A process of producing azo dyestuffs containing metals which comprises causing salts of halogen-substituted low molecular fatty acids with metals capable of forming complexes to act on azo dyestuffs which are capable of forming complex metal compounds.

2. A process of producing azo dyestuffs containing chromium which comprises causing salts of halogen-substituted low molecular fatty acids with chromium to act on azo dyestuffs which are capable of forming complex metal compounds.

3. A process of producing azo dyestuffs containing metals which comprises causing salts of monochloracetic acid with metals capable of forming complexes to act on azo dyestuffs which are capable of forming complex metal compounds.

4. A process of producing azo dyestuffs containing metals which comprises causing salts of dichloracetic acid with metals capable of forming complexes to act on azo dyestuffs which are capable of forming complex metal compounds.

HANS KRZIKALLA.
WALTHER KUEHNE.